United States Patent Office 2,728,639
Patented Dec. 27, 1955

2,728,639

DETECTION OF CYANIDES

Paul W. McConnaughey, Wilkinsburg, Pa., assignor to Mine Safety Appliances Company, Pittsburgh, Pa., a corporation of Pennsylvania No Drawing. Application August 1, 1952,
Serial No. 302,262

18 Claims. (Cl. 23—232)

This invention relates to the detection, both qualitative and quantitative, of a cyanide of the formula RCN in which R is hydrogen (H) or the vinyl radical ($CH_2=CH$) in air or other gases.

An object of the invention is to provide a simple, rapid and reliable method of detecting the presence of hydrogen cyanide (HCN) or vinyl cyanide ($CH_2CHCN$) in gases, particularly air, that may be practiced by unskilled persons, that is satisfactory for plant, field and laboratory use, that requires only simple, inexpensive and readily available materials and apparatus.

A further object is to provide a method in accordance with the foregoing object that is additionally adapted to the direct quantitative determination of the cyanides stated, especially in very low concentrations.

Still another object is to provide a reagent for use in the method of the invention that affords excellent sensitivity and good shelf life, or aging characteristics, that is inexpensive, and that is easily prepared from readily available materials.

Yet another object is to provide a device for practicing the method of this invention that is light, inexpensive, easily used, adapted to all types of use, and gives satisfactory results in the hands of non-technical personnel.

It is known that hydrogen cyanide causes a color reaction when passed into contact with an aqueous solution of o-tolidine (4,4' amino, 3,3' methyl diphenyl) and copper sulfate ($CuSO_4$). However, experience has shown that such a reagent suffers from the disadvantage of instability, i. e., its shelf life is short so that fresh reagent is needed, otherwise false indications are given. Modifications of the reagent intended to confer stability have been found to be likewise unsatisfactory, at least for important purposes, because of poor sensitivity, i. e., incapability of detecting small amounts of HCN in air.

The invention is predicated upon my discovery that the disadvantages of the foregoing reagents in detecting cyanides of the formula RCN in which R is H or $CH_2=CH$ in air or other gases are overcome and the objects of the invention attained by supplying the o-tolidine and copper sulfate in solution in glycerine ($CH_2OH.CHOH.CH_2OH$). This reagent upon being contacted with hydrogen cyanide or vinyl or vinyl cyanide promptly undergoes a distinctive change to a blue or bluegreen color. Copper acetate may be substituted.

Although the reagent of this invention may be used as a liquid through which the gas to be tested is passed, preferably the reagent is carried by or impregnated into an inert carrier such, for example, as filter paper. For most purposes, however, it is preferred to use as the inert carrier a granular material such as sand, silica gel, and similar materials of like nature, of which a variety are known and available commercially.

Although the proportions of the constituents of the reagent may be varied, for most purposes it is preferred to use a solution in the proportions of about 0.005 to 0.05 gm. of o-tolidine, about 0.005 to 0.05 gm. of copper sulfate or copper acetate (anhydrous basis) in from about 1.5 to 5.0 gms. of glycerine. Where the reagent is applied to an inert carrier, those proportions suffice for 10 gm. of the carrier, such as silica gel.

In the preferred practice of the invention the proportions are 0.02 gm. of o-tolidine, 0.02 gm. of copper sulfate (anhydrous basis) and 2.5 gms. of glycerine per 10 gm. of carrier.

Especially important features of the invention reside in the sensitivity and stability of the reagent. As to sensitivity, the preferred composition stated will detect 0.5 p. p. m. of HCN in air using a 100 ml. sample of air, which is equivalent to 0.54 microgram of HCN per liter of air. Experience has shown that when kept in sealed containers at room temperature for seven months the reagent does not lose that sensitivity for such low concentrations of the cyanide. The extreme extent of shelf life when so stored is not known but it is known that still longer life is possible in a modified embodiment, as will be described hereinafter.

For the purpose of such stability it is essential that the solvent for the active constituents of the reagent be glycerine or polyhydric alcohol, e. g., diethylene glycol, that functions similarly. Thus, substituting water for glycerine the reagent becomes inactive to hydrogen cyanide gas in a period of one day or less in the case of the liquid reagent, and when the aqueous reagent is carried by an inert carrier it ages noticeably in a period of less than one hour by changing from a white color to a greenish blue color in the absence of hydrogen cyanide, thus giving a false coloration.

Although, as indicated, the reagent may be used as a liquid, it is preferred, especially for field use, to apply it in the general manner described in Patent No. 2,174,349 to John B. Littlefield. I. e., an elongate column, or bed, of inert granular material carrying the reagent is disposed in a small cross-sectional tube of glass or other transparent material, the ends of which are then sealed. When a determination is to be made the sealed ends are opened and the air or other gas to be tested is flowed through the tube by any suitable means. In the presence of cyanides of the class stated the reagent promptly reacts with development of the characteristic color.

In addition to being useful for detecting qualitatively the presence of these cyanides, the invention is applicable also to their quantitative determination. To this end a measured volume of the air or other gas to be tested is passed through a tube as just described, and the length over which the color change occurs affords a direct measure of the cyanide concentration. For this purpose the measured volume of air may be supplied in various ways, as by means of an aspirator bulb of known volumetric delivery. By comparing the length over which the color change occurs with a scale calibrated by the use of different known cyanide concentrations, there is thus a direct determination. The color change produced is permanent so that the tubes serve for record purposes, if desired.

Such tubes possess stability and sensitivity satisfactory for many months. In a modified embodiment of the invention the reagent is supplied in the form of an ampoule containing a granular carrier, such as silica gel, impregnated with the proper proportion of the copper salt in glycerine, and a second ampoule containing a mixture of granular inert carrier and the proper proportion of o-tolidine. When a test is to be made the contents of the two ampoules are mixed and tubes for test purposes are filled with the mixture, with the determination being carried out as just described. This procedure permits a shelf life in the period of years for the components, plus at least seven months for the mixed gel.

Aromatic amino compounds other than o-tolidine do not give satisfactory results when substituted for it. For example, no color change occurs when diazoaminobenzene, diphenylamine, amino-azobenzene, p-toluidine and 4-benzeneazo-1-naphthylamine are substituted for o-tolidine. A blue satin color is produced by 4,4-tetramethyldiaminotriphenylmethane and by tetramethyldiaminodiphenylmethane but after a few days the color contrast is too low to be suited to detection of low RCN concentrations. Aniline and diethyl aniline when substituted for o-tolidine show some color change but the color is not intense enough for use in detecting low concentrations of HCN.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. A colorimetric reagent for a cyanide of the formula RCN in which R consists of H and $CH_2=CH$, said reagent being a solution of o-tolidine, a salt of the group consisting of copper sulfate and copper acetate, and glycerine.

2. A colorimetric reagent for a cyanide of the formula RCN in which R consists of H and $CH_2=CH$, said reagent being a solution of o-tolidine, a salt of the group consisting of copper sulfate and copper acetate, and glycerine in the proportions of 0.005–0.05 gm. of o-tolidine, 0.005–0.05 gm. of said salt, and 1.5–5.0 gm. of glycerine.

3. Reagent according to claim 2, said proportions being 0.2 gm. of o-tolidine, 0.2 gm. of said salt, and 2.5 gm. of glycerine.

4. A colorimetric reagent for a cyanide of the formula RCN in which R consists of H and $CH_2=CH$, said reagent being a solution of o-tolidine, a salt of the group consisting of copper sulfate and copper acetate, and glycerine carried by an inert carrier.

5. A colorimetric reagent for a cyanide of the formula RCN in which R consists of H and $CH_2=CH$, said reagent being a solution of o-tolidine, a salt of the group consisting of copper sulfate and copper acetate, and glycerine applied to an inert granular carrier in the proportions of 0.005–0.05 gm. of o-tolidine, 0.005–0.05 gm. of said salt, and 1.5–5.0 gm. of glycerine to 10 gm. of said carrier.

6. Reagent according to claim 5, said carrier being silica gel.

7. That method of testing a gas for a cyanide of the formula RCN in which R consists of H and $CH_2=CH$, comprising passing a measured volume of said gas through an elongate small cross-sectional area bed of inert material carrying a reagent comprising o-tolidine, a salt of the group consisting of copper sulfate and copper acetate, and glycerine, said reagent changing to a blue color on contact with said cyanide.

8. That method of testing a gas for a cyanide of the formula RCN in which R consists of H and $CH_2=CH$, comprising passing a measured volume of said gas through an elongate small cross-sectional area bed of inert granular material carrying a reagent comprising o-tolidine, a salt of the group consisting of copper sulfate and copper acetate, and glycerine carried by an inert granular carrier in the proportions of 0.005 to 0.05 gm. of o-tolidine, 0.005 to 0.05 gm. of said salt, and 1.5 to 5.0 gm. of glycerine to 10 gm. of said carrier, said reagent changing to a blue color on contact with said cyanide, and the length over which said color occurs being dependent upon the concentration of the cyanide.

9. A method according to claim 8, said carrier being silica gel.

10. A method according to claim 8, said proportions being 0.02 gm. of o-tolidine, 0.02 gm. of said salt, and 2.5 gm. of glycerine.

11. Device for testing a gas for a cyanide of the formula RCN in which R consists of H and $CH_2=CH$, comprising an elongate small cross-sectional area bed of inert granular material carrying a reagent comprising o-tolidine, a salt of the group consisting of copper sulfate and copper acetate, and glycerine disposed in a sealed transparent tube.

12. Device for testing a gas for a cyanide of the formula RCN in which R consists of H and $CH_2=CH$, comprising an elongate small cross-sectional area sealed tube of transparent material containing inert granular material carrying a reagent comprising o-tolidine, a salt of the group consisting of copper sulfate and copper acetate, and glycerine in the proportions of 0.005 to 0.05 gm. of o-tolidine, 0.005 to 0.05 gm. of said salt, and 1.5 to 5.0 gm. of glycerine to 10 gm. of said carrier, said reagent changing to a blue color on contact with said cyanide.

13. Device according to claim 12, said proportions being 0.02 gm. of o-tolidine, 0.02 gm. of said salt, and 2.5 gm. of glycerine.

14. Device according to claim 12, said carrier being silica gel.

15. A colorimetric reagent for a cyanide of the formula RCN in which R consists of H and $CH_2=CH$, said reagent being a solution of o-tolidine, a salt of the group consisting of copper sulfate and copper acetate, and a polyhydric alcohol.

16. Reagent according to claim 15, said alcohol being diethylene glycol.

17. Device for testing a gas for a cyanide of the formula RCN in which R consists of H and $CH_2=CH$, comprising an elongate small cross sectional area bed of inert granular material carrying a reagent comprising o-tolidine, a salt of the group consisting of copper sulfate and copper acetate, and a polyhydric alcohol disposed in a sealed transparent tube.

18. That method of testing a gas for a cyanide of the formula RCN in which R consists of H and $CH_2=CH$, comprising passing a measured volume of said gas through an elongate small cross-sectional area bed of inert material carrying a reagent comprising o-tolidine, a salt of the group consisting of copper sulfate and copper acetate, and a polyhydric alcohol, said reagent changing to a blue color on contact with said cyanide.

References Cited in the file of this patent

UNITED STATES PATENTS

| Number | Name | Date |
|---|---|---|
| 2,174,349 | Littlefield | Sept. 26, 1939 |
| 2,176,462 | McAllister | Oct. 17, 1939 |
| 2,483,108 | Silverman | Sept. 27, 1949 |
| 2,534,229 | Carhart et al. | Dec. 19, 1950 |
| 2,606,102 | Cook | Aug. 5, 1952 |

OTHER REFERENCES

Feigl: "Selective Sensitive Reactions," 1949 ed., pages 335–337. Academic Press Inc., publ. N. Y. C.